(12) United States Patent
Kim et al.

(10) Patent No.: US 9,646,608 B2
(45) Date of Patent: May 9, 2017

(54) VOICE RECOGNITION APPARATUS AND METHOD OF CONTROLLING THE SAME

(71) Applicant: Samsung Electronics Co., Ltd., Suwon-si (KR)

(72) Inventors: Kyung-duk Kim, Suwon-si (KR); Kyoung-min Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/940,414

(22) Filed: Nov. 13, 2015

(65) Prior Publication Data

US 2016/0148611 A1 May 26, 2016

(30) Foreign Application Priority Data

Nov. 21, 2014 (KR) ........................ 10-2014-0163670

(51) Int. Cl.
| | |
|---|---|
| *G10L 15/08* | (2006.01) |
| *G10L 15/14* | (2006.01) |
| *G10L 15/183* | (2013.01) |
| *G10L 15/22* | (2006.01) |

(52) U.S. Cl.
CPC ............ *G10L 15/14* (2013.01); *G10L 15/083* (2013.01); *G10L 15/183* (2013.01); *G10L 15/22* (2013.01); *G10L 2015/081* (2013.01)

(58) Field of Classification Search
USPC .................................. 704/231–257, 270–278
See application file for complete search history.

(56) References Cited

U.S. PATENT DOCUMENTS 5,983,180 A * 11/1999 Robinson .............. G10L 15/142
704/254
8,630,860 B1   1/2014 Zhang et al.
(Continued)

FOREIGN PATENT DOCUMENTS

EP   1475780 A1   11/2004
GB   2409750   7/2005

OTHER PUBLICATIONS

Extended European Search Report dated Apr. 6, 2016 in European Patent Application No. 15195043.3.
(Continued)

*Primary Examiner* — Abul Azad
(74) *Attorney, Agent, or Firm* — Staas & Halsey LLP

(57) ABSTRACT

A voice recognition apparatus includes a voice recognizer configured to recognize user utterance, a storage unit configured to store a plurality of tokens, a token network generator configured to generate a plurality of recognition tokens from the recognized user utterance, search for a similar token similar to each of the recognition tokens and a peripheral token having a history used with the recognition token among the plurality of tokens stored in the storage unit, and generate a token network using the recognition token, the similar token, and the peripheral token, and a processor configured to control the token network generator to generate the token network in response to the user utterance being recognized through the voice recognizer, calculate a transition probability between the tokens constituting the token network, and generate text data for corrected user utterance using the calculated transition probability.

16 Claims, 14 Drawing Sheets

(56) References Cited

U.S. PATENT DOCUMENTS

2005/0149326 A1* 7/2005 Hogengout ............. G10L 15/08
                                                            704/242
2011/0224983 A1    9/2011  Moore
2012/0316877 A1   12/2012  Zweig et al.

OTHER PUBLICATIONS

Eo-June (Paul) Hsu, "Generalized Linear Interpolation of Language Models", IEEE Workshop on Automatic Speech Recognition & Understanding, 2007, pp. 136-140.
B. Lecouteux et al., "System Combination by Driven Decoding", IEEE International Conference on Acoustics, Speech, and Signal Processing, 2007, pp. 341-344.
X. Liu et al., "Use of contexts in language model interpolation and adaptation", Computer Speech and Language 27, 2003, pp. 301-321.

* cited by examiner

VOICE RECOGNITION APPARATUS AND METHOD OF CONTROLLING THE SAME

CROSS-REFERENCE TO RELATED APPLICATIONS

This application claims priority from Korean Patent Application No. 10-2014-0163670, filed on Nov. 21, 2014, in the Korean Intellectual Property Office, the disclosure of which is incorporated herein by reference in its entirety.

BACKGROUND

1. Field

The following description relates to a voice recognition apparatus and a method of controlling the same, and more particularly, to a voice recognition apparatus which corrects a recognition error for user utterance by generating a token network for the user utterance, and a method of controlling the same.

2. Description of the Related Art

Due to the development of electronic technology and a variety of user needs, various types of electronic apparatuses have been developed. In recent years, the technology for controlling the electronic apparatuses through a user voice has appeared. Various interactive interfaces have been developed to control the electronic apparatus through user utterance and have been used to various electronic apparatuses.

In general, the voice recognition apparatuses may perform a processing of recognizing user utterance through voice recognizers. In response to an error in recognition of the user utterance being caused in the voice recognizer, the error is propagated to the following processing process using the recognition result of the recognizer, and thus wrong service may be provided to the user.

To correct the voice recognition error in the voice recognition apparatus, a method of correcting the voice recognition error by applying technology for correcting a typing error in spellings used for web browsing and the like or by constituting a voice recognition result and the original user utterance with a kind of noise channel has been proposed.

However, because the voice recognition error in the voice recognition apparatus is caused in response to a word actually uttered by the user being wrongly recognized as another word similar thereto, the wrongly recognized word may not be misspelled. Therefore, the technology for correcting the misspelled expression used for web browsing may not be correctly applied. The method of constituting a noise channel may not correct the error with respect to the expression which is not used in training of the noise channel.

Therefore, there is a need for technology for correcting a voice recognition error even in response to the voice recognition error being caused in the voice recognition apparatuses.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to a voice recognition apparatus capable of correcting an utterance recognition error caused in response to user utterance being recognized therethrough and a method of controlling the same.

According to an aspect of an exemplary embodiment, a method of controlling a voice recognition apparatus includes generating a plurality of recognition tokens by recognizing user utterance; searching for a similar token similar to each of the recognition tokens and a peripheral token having a history used with the recognition token among a plurality of pre-stored tokens; generating a token network using the recognition token, the similar token, and the peripheral token; and calculating a transition probability between the tokens constituting the token network and generating text data for corrected user utterance using the calculated transition probability.

The plurality of pre-stored tokens may be generated by dividing a content list, a corpus, an utterance log by predetermined units of tokens. The searching may include searching for the similar token using pre-stored degree of similarity between the pre-stored tokens in response to the recognition token being presented among the plurality of pre-stored tokens.

The searching may include searching for the similar token using a string searching algorithm in response to the recognition token not being presented among the plurality of pre-stored tokens.

The searching may include searching for the peripheral token in response to the recognition token not being presented among the plurality of pre-stored tokens.

The generating of the plurality of recognition tokens may include generating the text data for the user utterance by recognizing the user utterance; and generating the plurality of recognition tokens by dividing the generated text data for the user utterance in predetermined units. The generating of the token network may include generating the token network by arranging the similar token and the peripheral token to correspond to each of the plurality of recognition tokens.

The generating of the text data for the corrected user utterance may include calculating a transition probability between the tokens using language models for pre-stored content list, corpus, and utterance log.

The generating of the text data for the corrected user utterance may include calculating a transition probability between the tokens by assigning predetermined weights to the language models; and searching for an optimum path on the token network based on the calculated transition probability between the tokens.

The searching for the optimum path may include searching for the optimum path using at least one algorithm of Viterbi and a-star.

The method may further include calculating a probability in which the corrected user utterance occurs; and outputting a re-utterance request message in response to the probability in which the corrected user utterance occurs being less than or equal to a predetermined value.

According to an aspect of an exemplary embodiment, a voice recognition apparatus includes a voice recognizer configured to recognize user utterance; a storage unit configured to store a plurality of tokens; a token network generator configured to generate a plurality of recognition tokens from the recognized user utterance, search for a similar token similar to each of the recognition tokens and a peripheral token having a history used with the recognition token among the plurality of tokens stored in the storage unit, and generate a token network using the recognition token, the similar token, and the peripheral token; and a processor configured to control the token network generator to generate the token network in response to the user utterance being recognized through the voice recognizer, calculate a transition probability between the tokens constituting the token network, and generate text data for corrected user utterance using the calculated transition probability.

The storage unit may store the plurality of tokens generated by dividing a content list, a corpus, an utterance log by predetermined units of tokens and degree of similarity between the tokens, and the token network generator may search for the similar token using the degree of similarity between the tokens in response to the recognition token being presented among the plurality of tokens.

The token network generator may search for the similar token using a string searching algorithm in response to the recognition token not being presented among the plurality of tokens.

The token network generator may search for the peripheral token in response to the recognition token not being presented among the plurality of tokens.

The processor may generate the text data for the user utterance in response to the user utterance being recognized through the voice recognizer, and the token network generator may generate the plurality of recognition tokens by dividing the generated text data for the user utterance in predetermined units, and generate the token network by arranging the similar token and the peripheral token to correspond to each of the plurality of recognition tokens.

The storage unit may store language models for a content list, a corpus, and an utterance log, and the processor may calculate the transition probability between the tokens using the stored language models.

The processor may calculate the transition probability between the tokens by assigning predetermined weights to the language models, and generate the text data for the corrected user utterance by searching an optimum path on the token network based on the calculated transition probability between the tokens.

The processor may search for the optimum path using at least one algorithm of Viterbi and a-star.

The voice recognition apparatus may further include at least one of a display configured to display an image and an audio output unit configured to output sound. The processor may calculate a probability in which the corrected user utterance occurs, and control the at least one of the display and the audio output unit to output a re-utterance request message in response to the probability in which the corrected user utterance occurs being less than or equal to a predetermined value.

According to various exemplary embodiments, all kinds of utterance recognition errors caused in response to the user utterance being recognized in the voice recognition apparatus may be accurately and efficiently corrected.

Additional aspects and advantages of the exemplary embodiments are set forth in the detailed description, and will be obvious from the detailed description, or may be learned by practicing the exemplary embodiments.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1:
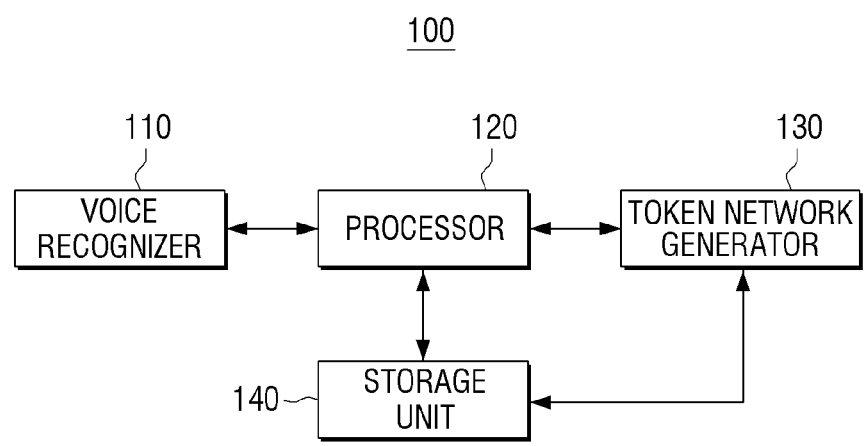
FIG. 1 is a block diagram illustrating a configuration of a voice recognition apparatus according to an exemplary embodiment.

Reference will now be made in detail to the embodiments, examples of which are illustrated in the accompanying drawings, wherein like reference numerals refer to the like elements throughout. The embodiments are described below to explain the present disclosure by referring to the figures.

Exemplary embodiments are described herein with reference to cross-sectional illustrations that are schematic illustrations of exemplary embodiments (and intermediate structures). Thus, exemplary embodiments should not be construed as limited to the particular shapes of regions illustrated herein. These inventive concepts may, however, be embodied in different forms and it will be appreciated by those of ordinary skill in the art that changes may be made in these exemplary embodiments without departing from the principles and spirit of the inventive concept, the scope of which is defined by the claims and their equivalents. Also, well-known functions or constructions are not described in detail because they would obscure the disclosure with unnecessary detail.

The processor may be generally configured to be in charge of controlling an apparatus, and may be mixedly used with a central processing unit (CPU), a microprocessor, a controller, and the like. The processor may be configured to control an overall operation of the apparatus, and may be implemented with a system-on-a-chip or system on chip (SOC or SoC).

FIG. 1 is a block diagram illustrating a configuration of a voice recognition apparatus according to an exemplary embodiment. Referring to FIG. 1, a voice recognition apparatus 100 may include a voice recognizer 110, a processor 120, a token network generator 130, and a storage unit 140.

The voice recognizer 110 may recognize a user utterance. For example, in response to the user utterance being input, the voice recognizer 110 may recognize the user utterance and provide the recognized result to the processor 120. The processor 120 may generate text data for the user utterance. In this example, the voice recognizer 110 may include a voice recognition sensor including a microphone and the like. The detailed methods of recognizing the user utterance through the voice recognizer 110 may employ known technology. Therefore, a detailed description of the voice recognition methods will be omitted.

The storage unit 140 may store information such as a variety of programs or data required for the operation of the voice recognition apparatus. For example, the storage unit 140 may store a content list which is a list for pieces of contents which are serviced in the voice recognition apparatus 100, a corpus which is a list that sentences, which are likely to be uttered by the user, are previously collected, and an utterance log for a recognized result of an sentence which is previously actually uttered by the user. For example, in response to the voice recognition apparatus 100 being a display apparatus such as a television (TV), titles of various broadcast programs may be stored as the content list in the storage unit 140. Sentences such as "search for XXX", "Volume up", "Channel up", or "remind me when breaking bad is on" may be stored as the corpus in the storage unit 140. The recognized result of actual utterance of the user may be stored as the utterance log in the storage unit 140.

The processor 120 may generate a plurality of tokens by dividing the content list, the corpus, and the utterance log stored in the storage unit 140 by predetermined units of tokens, and may store the plurality of generated tokens in the storage unit 140. The token may refer to a string including one or more characters having a meaning in group units. That is, the token may refer to that the various words or sentences which are likely to be uttered by the user are divided by predetermined units, for example, syllable units, morpheme units, or word units. For example, in English, the token may be divided based on spacing. In this example, one token may be one word.

In response to the user utterance being recognized through the voice recognizer 110, the processor 120 may generate text data for the user utterance. The processor 120 may provide the generated text data to the token network generator 130. The token network generator 130 may divide the text data for the user utterance in predetermined token units by parsing the text data.

The processor 120 may calculate a degree of similarity indicating similar degree between the plurality of tokens which are generated and stored in advance, and store the degree of similarity in the storage unit 140. The detailed methods of calculating the degree of similarity may employ known technology, and thus a detailed description thereof will be omitted. The processor 120 may store information indicating whether which tokens appear in a periphery of a specific token from the content list, the corps, and the utterance log. That is, the processor 120 may store information indicating a history used together with tokens, which is information indicating whether which token is presented before and after a corresponding token before a specific token is divided into the token, in the storage unit 140.

That is, the plurality of tokens generated from the content list, the corpus, and the utterance log, the degree of similarity between the plurality of tokens, and the information for tokens having the history used together with the plurality of tokens may be pre-stored in the storage unit 140.

The storage unit 140 may store language models for the content, the corpus, and the utterance log. For example, the processor 120 may generate the language models for the content list, the corpus, and the utterance log from the content list, the corpus, and the utterance log stored in the storage unit 140, and may store the generated language modules in the storage unit 140. The language model may be a model which calculates degree of matching between a word string and an actually used language by modeling words used by people. That is, the language model may be a model which calculates a probability that an arbitrary sentence exists, and the processor 120 may calculate a probability that each token on the token network is transited to next token using the language model. Any language model capable of calculating the transition probability between the tokens may be used as the language model, and thus a detailed description thereof will be omitted.

The token network generator 130 may generate a token network according to control of the processor 120. For example, token network generator 130 may generate a plurality of recognition tokens from the user utterance recognized through the voice recognizer 110, search for similar tokens similar to the generated recognition tokens and peripheral tokens having a history used together with the generated recognition tokens among the plurality of tokens stored in the storage unit 140, and generate the token network using the generated recognition tokens and the searched similar tokens and peripheral tokens.

More specifically, the token network generator 130 may generate the plurality of recognition tokens by dividing the user utterance recognized through the voice recognizer 110 in predetermined units. For example, in response to the user utterance being recognized through the voice recognizer 110, the processor 120 may generate text data for the user utterance and provide the generate text data to the token network generator 130, and the token network generator 130 may generate the plurality of recognition tokens by dividing the text data for the user utterance in predetermined units.

The token network generator 130 may search for the similar tokens and the peripheral tokens for the generated recognition tokens. For example, in response to a corresponding recognition token being presented among the plurality of tokens stored in the storage unit 140, the token network generator 130 may search for the similar tokens using degree of similarity between the corresponding recognition token stored in the storage unit 140 and other tokens. In this example, the token network generator 130 may search for tokens having the degree of similarity more than or equal to a predetermined value as the similar tokens for the recognition token. The token network generator 130 may search for the peripheral tokens for the corresponding recognition token using the history used together with the plurality of tokens stored in the storage unit 140.

According to an exemplary embodiment, in response to a recognition token not being presented among the plurality of tokens stored in the storage unit 140, that is, in response to the same token as the corresponding recognition token not being presented among the plurality of tokens stored in the storage unit 140 and thus the similar token not being searched for using the degree of similarity, the token network generator 130 may search for the similar tokens using a string search algorithm. As the string search algorithm, soundex, q-gram, or the like may be used, and the string search algorithm is not limited thereto.

In response to the recognition token not being presented among the plurality of tokens stored in the storage unit 140, the token network generator 130 may search for the peripheral tokens. The searching method for the peripheral tokens will be described with reference to FIGS. 3 and 5.

Figure 6:
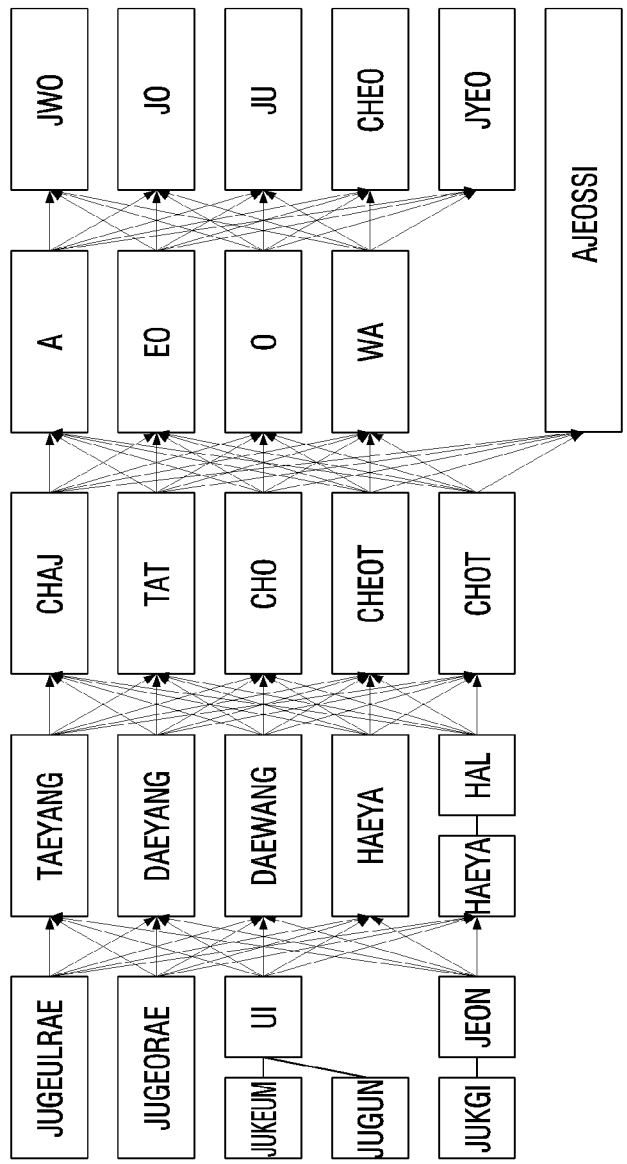
FIG. 6 is a diagram illustrating a token network according to an exemplary embodiment.

The token network generator 130 may generate the token network using the plurality of recognition tokens, and the similar tokens and the peripheral tokens for the plurality of recognition tokens which are searched for described above. For example, the token network generator 130 may generate the token network by arranging the similar token and the peripheral token to correspond to each of the plurality of recognition tokens. In this example, the token network may have a trellis upon which the plurality of recognition tokens are arranged, for example, in order of the recognized user utterance, and the similar tokens and the peripheral tokens corresponding to the recognition tokens are arranged below the recognition tokens to correspond to the recognition tokens, but the structure of the token network is not limited thereto. FIG. 6 illustrates an example of the token network having the trellis.

The processor 120 may control the voice recognizer 110 and the token network generator 130. For example, the processor 120 may calculate a transition probability between the tokens constituting the token network and generate the text data for corrected user utterance using the calculated transition probability. The token network generator 130 may be embodied in the processor 120.

For example, the processor 120 may calculate the transition probability using the language models for the content list, the corpus, and the utterance log stored in the storage unit 140. For example, in response to a probability that a token "jugeulrae" is transited to a token "daewang" in the token network as illustrated in FIG. 6 being calculated, the processor 120 may calculate the probability that the token "jugeulrae" is transited to the token "daewang" on the token network as illustrated in FIG. 6 by calculating a probability that the token "jugeulrae" is transited to the token "daewang" in the content list language model, a probability that the token "jugeulrae" is transited to the token "daewang" in the corpus language model, and a probability that the token "jugeulrae" is transited to token "daewang" in the utterance log language model, and adding the calculated probabilities by assigning weights to the calculated transition probabilities. Through the above-described method, the processor 120 may calculate the transition probability that each token is transited to next token with respect to all the tokens constituting the token network of FIG. 6.

Figure 11:
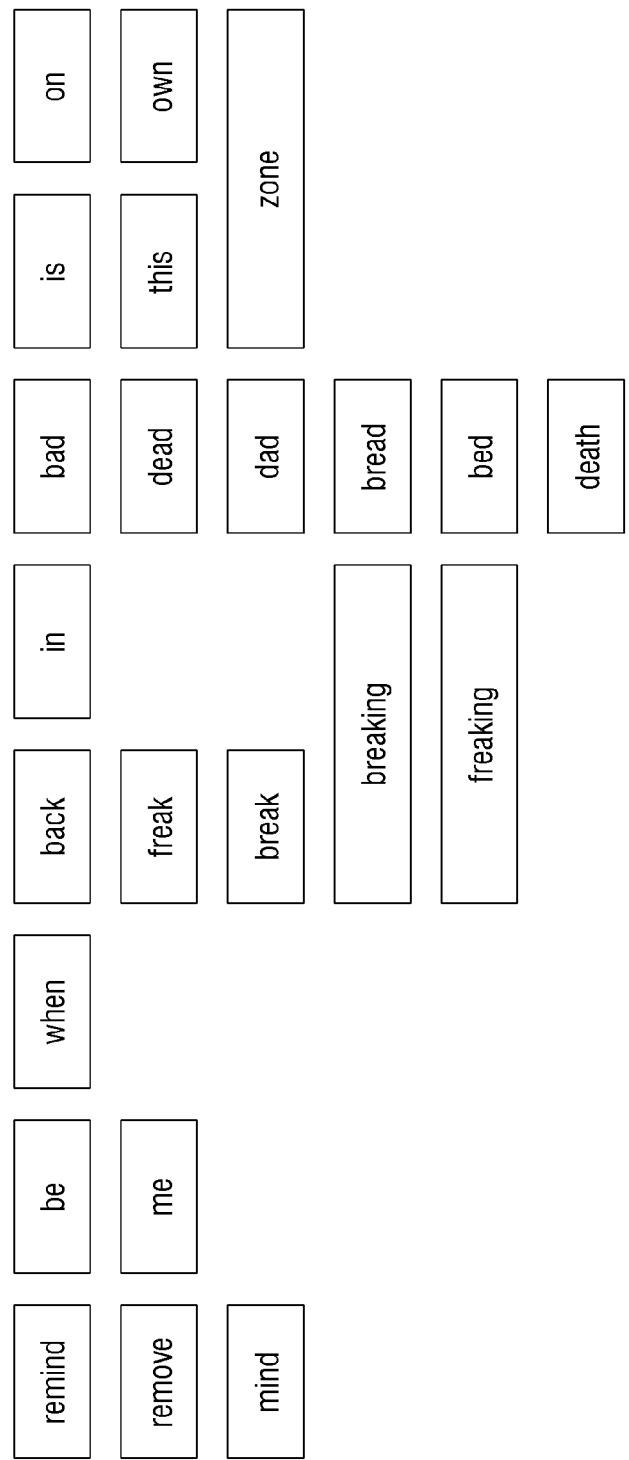
FIG. 11 is a diagram illustrating a recognition token and a similar token according to an exemplary embodiment.

In an example, in response to a probability that a token "remind" is transited to a token "me" in a token network as illustrated in FIG. 11, the processor 120 may calculate the probability that the token "remind" is transited to the token "me" on the token network as illustrated in FIG. 11 by calculating a probability that the token "remind" is transited to the token "me" in the content list language model, a probability that the token "remind" is transited to token "me" in the corpus language model, and a probability that the token "remind" is transited to the token "me" in the utterance log language model, and adding the calculated probabilities by assigning weights to the calculated transition probabilities. Through the above-described method, the processor 120 may calculate the transition probability that each token is transited to next token with respect to all the tokens constituting the token network of FIG. 11.

The processor 120 may generate the text data for the corrected user utterance by searching for an optimum path on the token network based on the calculated transition probability. The processor 120 may reduce a calculation amount for searching the optimum path by searching for the optimum path using at least one algorithm of Viterbi and a-star.

Accordingly, in response to the optimum path being searched for, the processor 120 may generate the text data for the corrected user utterance by coupling tokens located in a path for coupling the optimum path.

Figure 2:
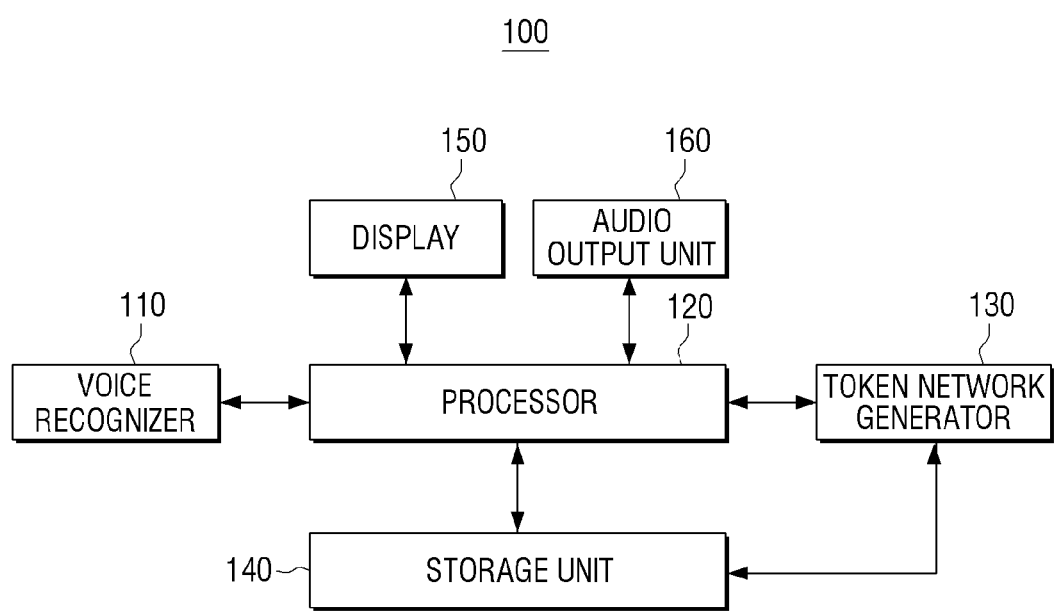
FIG. 2 is a block diagram illustrating a configuration of a voice recognition apparatus according to an exemplary embodiment.

FIG. 2 is a block diagram illustrating a configuration of a voice recognition apparatus according to an exemplary embodiment. A voice recognition apparatus illustrated in FIG. 2 may further include a display 150 and an audio output unit 160 in addition to the configuration components of the voice recognition apparatus 100 of FIG. 1. The remaining components of the voice recognition apparatus 100 of FIG. 2 are the same as those in the voice recognition apparatus 100 of FIG. 1, and thus a description for the overlapping configuration will be omitted.

The display 150 may display an image. For example, the display 150 may display a message for requesting re-utterance to the user according to control of the processor 120. The display 150 may include any display capable of displaying the user re-utterance request message and the display 150 may be implemented with a liquid crystal display (LCD), a cathode-ray tube (CRT), a plasma display panel (PDP), a light emitting diode (LED), an organic light emitting diode (OLED), and the like.

The audio output unit 160 may output a voice signal. For example, the audio output unit 160 may output the user re-utterance request message in the voice according to control of the processor 120. The audio output unit 160 may include any device capable of outputting the user re-utterance request message in the voice and may be implemented with a speaker, an earphone, and the like.

The processor 120 may calculate a probability that the corrected user utterance occurs. For example, in response to the text data for the corrected user utterance being generated, the processor 120 may calculate a total probability that the user utterance occurs. In this example, the processor 120 may calculate the probability that the corrected user utterance occurs, for example, using the various language models stored in the storage unit 140.

In response to the calculated probability being less than or equal to a predetermined value, the processor 120 may control any one of the display 150 and the audio output unit 160 to generate the re-utterance request message and output the generated message. For example, in response to the probability that the corrected user utterance occurs being less than or equal to the predetermined value, the processor 120 may control the display 150 and the audio output unit 160 to generate the re-utterance request message such as "please utter again" and output the generated message.

According to an exemplary embodiment, the processor 120 may control the display 150 to display the text data for the corrected user utterance, and control the audio output unit 160 to output the text data for the corrected utterance in a voice. Accordingly, the user may determine whether or not his/her utterance is correctly recognized.

As described above, in response to the recognition error being still presented even through the recognition error of the user utterance is corrected through the voice recognition apparatus 100, the voice recognition apparatus 100 may determine the remaining recognition error, and correct the recognition error by requesting the re-utterance to the user.

The exemplary embodiments of FIGS. 1 and 2 have described the example that the token network generator 130 and the processor 120 may be separately configured. However, the configuration is not limited thereto, and the token network generator 130 may be included in the processor 120 and may be implemented in one configuration.

Hereinafter, the configuration and operation of the voice recognition apparatus 100 will be described in detail with reference to FIGS. 3 to 7. Description for a portion overlapping the portion described in FIGS. 1 and 2 will be omitted.

Figure 3:
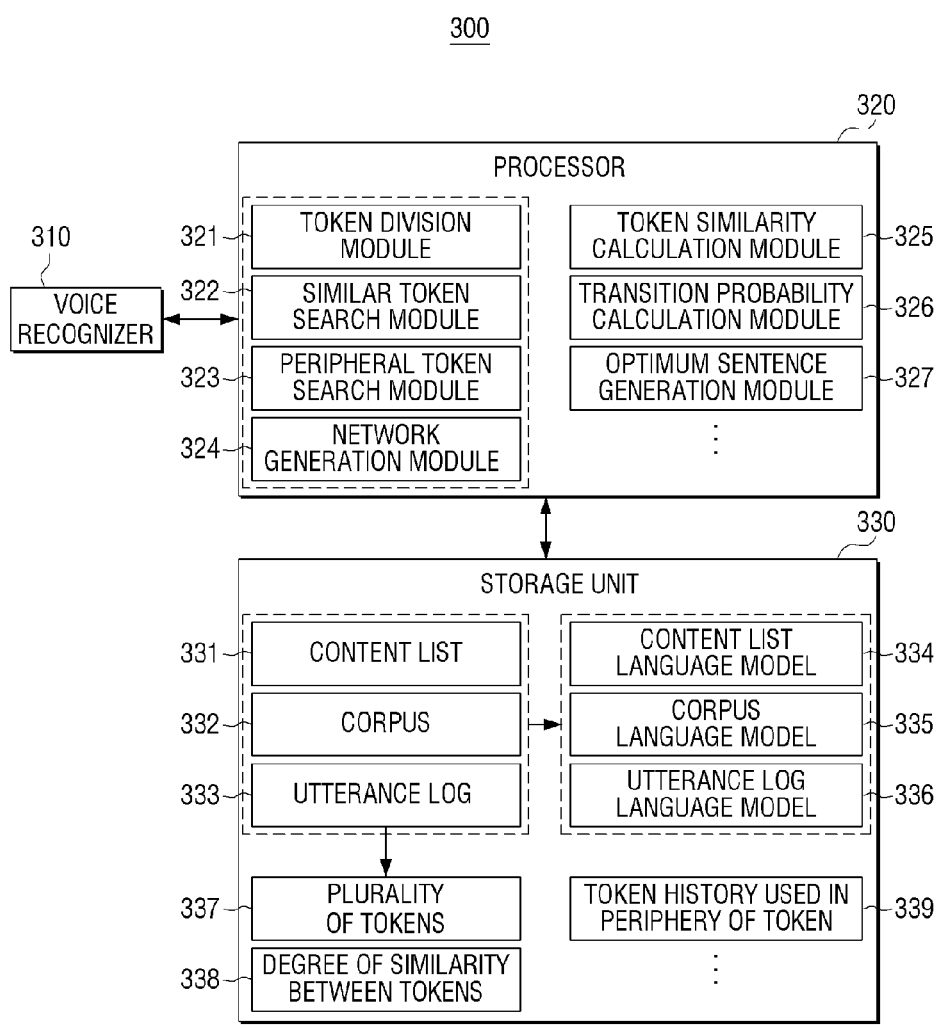
FIG. 3 is a detailed block diagram illustrating a configuration of a voice recognition apparatus according to an exemplary embodiment.

FIG. 3 is a detailed block diagram illustrating a voice recognition apparatus in response to a token network generator being included in a processor to be implemented with one configuration according to an exemplary embodiment, and FIGS. 4 to 7 are diagrams illustrating a processor of generating text for corrected user utterance in response to "Jugunui taeyang chajajwo" being uttered by the user but "Jugeulrae taeyang chajajwo" being recognized. FIGS. 11 to 14 are diagrams illustrating a processor of generating text for corrected user utterance in response to "Remind me when breaking bad is on" being uttered by the user but "Remind be when back in bad is on" being recognized.

Referring to FIG. 3, a voice recognition apparatus 300 may include a voice recognizer 310, a processor 320, and a storage unit 330. The processor 320 may include a token division module 321, a similar token search module 322, a peripheral token search module 323, a network generation module 324, a token similarity calculation module 325, a transition probability calculation module 326, and an optimum sentence generation module 327.

The token similarity calculation module 325 may calculate a degree of similarity between a plurality of tokens 337 stored in the storage unit 330. For example, the plurality of tokens 337 which are generated from a token content list 331, a corpus 332, and an utterance log 333 may be stored in the storage unit 330. The token similarity calculation module 325 may calculate the degree of similarity between the plurality of tokens stored in the storage unit 330 and store the calculated degree of similarity as a degree of similarity 338 between tokens in the storage unit 330.

The token division module 321 may generate a plurality of recognition tokens by dividing user utterance recognized through the voice recognizer 310 in predetermined units. The predetermined units may be syllable units, word units, morpheme units, or the like.

Figure 4:
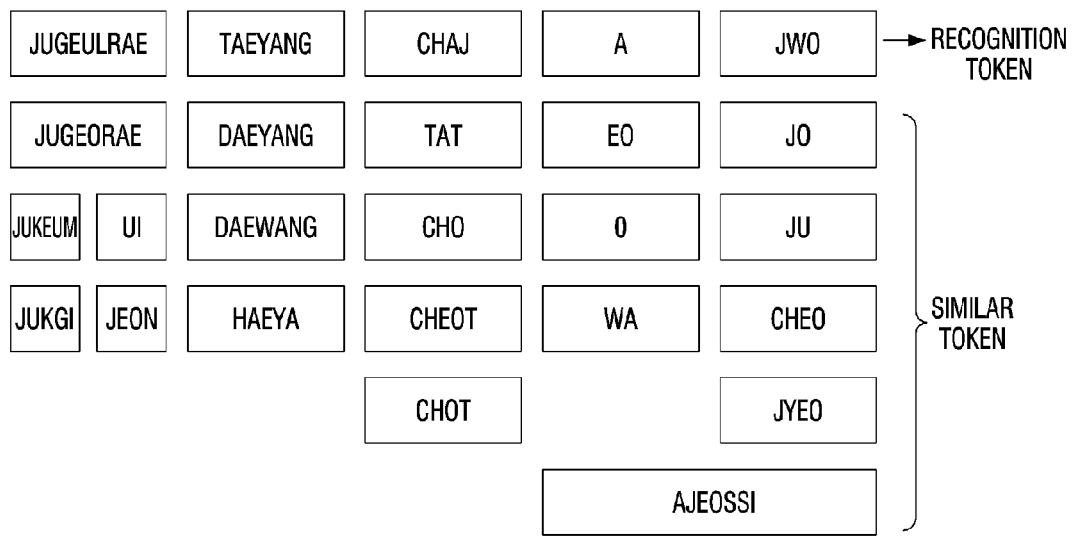
FIG. 4 is a diagram illustrating a recognition token and a similar token according to an exemplary embodiment.

FIG. 4 illustrates an example that a plurality of tokens are generated and a similar token for each of the recognition tokens is searched for. In the example of FIG. 4, "Jugunui taeyang chajajwo" is uttered by the user, but the voice recognizer 310 may recognize the user utterance as "Jugeulrae taeyang chajajwo", and the token division module 321 may generate a plurality of recognition tokens by dividing the user utterance recognized through the voice recognizer 310 into five tokens such as "Jugeulrae", "taeyang", "chaj", "a", and "jwo".

Similarly, FIG. 11 illustrates an example that a plurality of tokens are generated and a similar token for each of the recognition tokens is searched for. In the example of FIG. 11, "Remind me when breaking bad is on" is uttered by the user, but the voice recognizer 310 may recognize the user utterance as "Remind be when back in bad is on", and the token division module 310 may generate a plurality of recognition tokens by dividing the user utterance recognized through the voice recognizer 321 into eight tokens such as "remind", "be", "when", "back", "in", "bad", "is", and "on".

The similar token search module 322 may search for a similar token similar to each of the recognition tokens among the plurality of tokens 337 stored in the storage unit 330. In response to the recognition token being presented among the plurality of tokens 337 stored in the storage unit 330, the similar token search module 322 may search for the similar token using the degree of similarity 338 between tokens. In response to the recognition token not being presented among the plurality of tokens 337 stored in the storage unit 330, the similar token search module 322 may search for the similar token using a string searching algorithm.

It can be seen from the example of FIG. 4 that similar tokens are searched for with respect to the five recognition tokens such as "jugeulrae", "taeyang", "chaj", "a", and "jwo". FIG. 4 illustrates that in response to the tokens "taeyang", "chaj", "a", and "jwo" among the five tokens, the same tokens may be presented among the plurality of tokens 337 stored in the storage unit 330, and thus the similar tokens may be searched for using the degree of similarity 338 between tokens. FIG. 4 illustrates that in response to "Jugeulrae", the same token may not be presented among the plurality of tokens 337, and thus the similar token may be searched for using a string searching algorithm.

Similarly, it can be seen from the example of FIG. 11 that similar tokens are searched for with respect to the eight recognition tokens such as "remind", "be", "when", "back", "in", "bad", "is", and "on". FIG. 11 illustrates that in response to the eight tokens such as "remind", "be", "when", "back", "in", "bad", "is", and "on", the same tokens may be presented among the plurality of tokens 337 stored in the storage unit 330, and thus the similar tokens may be searched for using the degree of similarity 338 between tokens. In the exemplary embodiment, the similar tokens may not be searched for through a string searching algorithm which is used in response to the same token not being presented among the plurality of tokens 337 as a word which is not presented in a dictionary.

According to an exemplary embodiment, reduction in the processing rate of the voice recognition apparatus 300 may be alleviated through the limitation of a search range and a maximum searching number of the similar token search module 322.

For example, according to an exemplary embodiment, the user or a manufacturer of the voice recognition apparatus may restrict a similar token search range of the similar token search module 322. In this example, the similar token search module 322 may search for the similar token in a limited range. For example, in response to the search range being set to two, the similar token search module 322 may search for tokens of one or two ranges similar to one recognition token with respect to the one recognition token. In this example, the similar token search module 322 may search for tokens of one or two ranges similar to two recognition tokens.

FIG. 4 illustrates that the search range of the similar token search module 322 is set to two. Referring to FIG. 4, it can be seen that with respect to one recognition token such as "Jugeulrae", "jugeorae" may be searched for as a similar token of one range, and "jukeum" and "ui" and "jukgi" and "jeon" may be searched for as a similar token of two ranges. It can be seen that with respect to two recognition tokens such as "a" and "jwo", "ajeossi" may be searched for as a similar token of one range.

FIG. 11 also illustrates that the search range of the similar token search module 322 is set to two. Referring to FIG. 11, it can be seen that with respect to two recognition tokens such as "back" and "in", "breaking" and "freaking" may be searched as a similar token of one range. It can be seen that with respect to two recognition tokens such as "in" and "on", "zone" may be searched for as a similar token of one range.

According to an exemplary embodiment, the user or a manufacturer of the voice recognition apparatus may restrict a maximum number of a similar token which is searched for in the similar token search module 322. For example, in response to the maximum number being set to ten, the similar token search module 322 may search for up to ten similar tokens with respect to the one recognition token. The searching of the similar token may be performed in order of the higher degree of similarity.

The peripheral token search module 323 may search for a peripheral token having a history used together with a recognition token. For example, the processor 320 may generate the plurality of tokens 337 by dividing the content list 331, the corpus 332, and the utterance log 333 stored in the storage unit 330 in predetermined units, and thus the processor 320 may store information indicating whether which token is presented in a periphery of each token before the plurality of tokens 337 are divided from the content list 331, the corpus 332, and the utterance log 333 as a token history 339 used in a periphery of a token in the storage unit 330. Accordingly, the peripheral token search module 323 may search for the peripheral token using the token history 339 used in a periphery of a token stored in the storage unit 330.

According to an exemplary embodiment, in response to the recognition token not being presented among the plurality of tokens 337 stored in the storage unit 330, the peripheral token search module 323 may search for the peripheral token. For example, in response to a corresponding recognition token not being presented among the plurality of tokens 337 stored in the storage unit 330, the peripheral token search module 323 may search for a peripheral token of the corresponding recognition token which is located just before and after the corresponding recognition token. The reason that the peripheral token is searched for only in response to the recognition token not being presented among the plurality of tokens 337 is because a lot of time are required in response to the peripheral token being searched for with respect to all the recognition tokens. Accordingly, the processing rate of the voice recognition apparatus 300 may be increased by searching for the peripheral token only in response to the recognition token not being presented among the plurality of tokens 337 stored in the storage unit 330.

Figure 5:
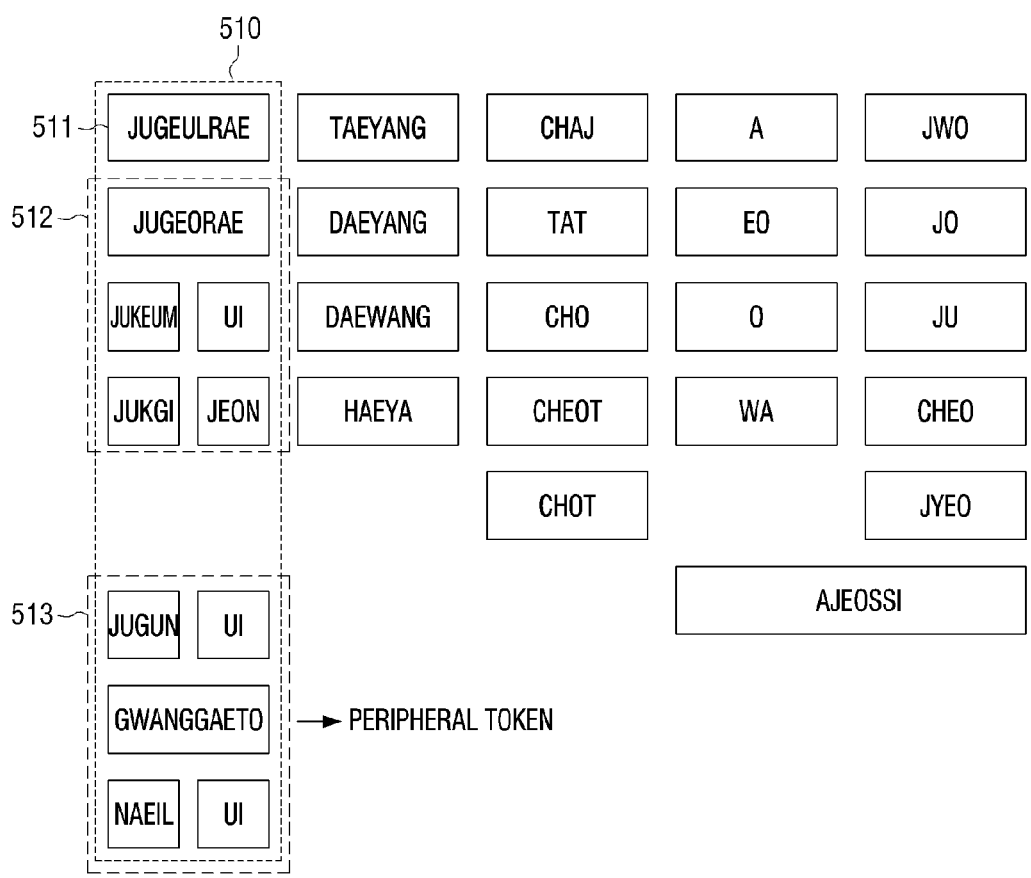
FIG. 5 is a diagram illustrating a recognition token, a similar token, and a peripheral token according to an exemplary embodiment.

FIG. 5 illustrates an example that a similar token is searched for as illustrated in FIG. 4, and a peripheral token is further searched for. It can be seen that with respect to a recognition token 511 "jugeulrae", a similar token 512 is searched for and a peripheral token 513 is further searched for as indicated with the reference numeral 510 of FIG. 5.

For example, it can be seen that because the recognition token "jugeulrae" is not presented among the plurality of tokens 337, the similar token search module 322 may search for the similar token 512 using a string search algorithm as described in FIG. 4, and the peripheral token search module 323 may search for tokens as indicated with the reference numeral 513 as a peripheral token of the recognition token "taeyang" which is located just after the recognition token "jugeulrae".

That is, because "jugeulrae" is a recognition token which is not present among the plurality of tokens 337, the peripheral token search module 323 may search for the peripheral token 513 having a history used before "taeyang" which is located after "jugeulrae" as an alternative candidate of "jugeulrae".

Figure 12:
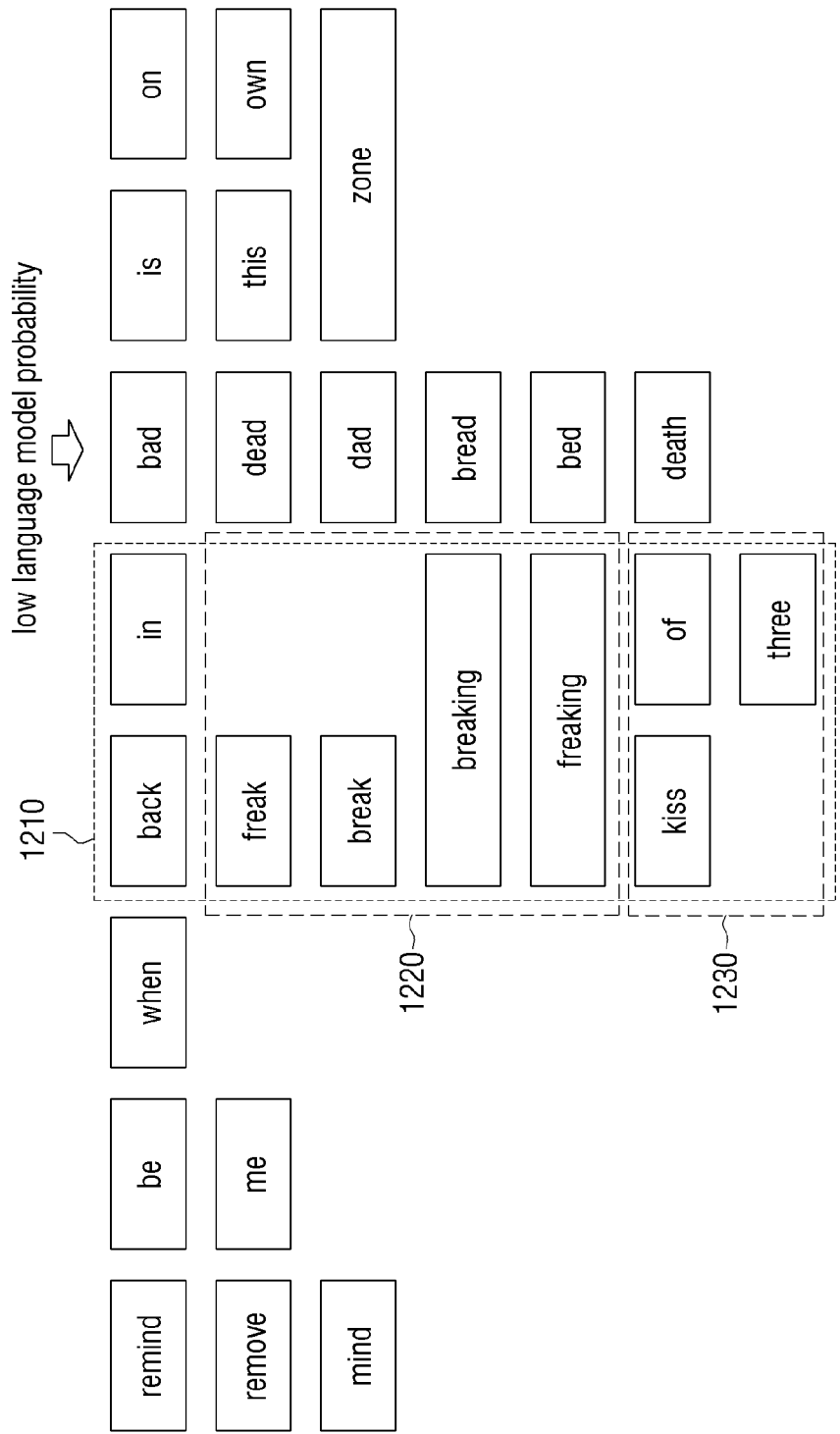
FIG. 12 is a diagram illustrating a recognition token, a similar token, and a peripheral token according to an exemplary embodiment.

FIG. 12 illustrates an example that a similar token is searched for as illustrated in FIG. 11, and a peripheral token is further searched for. It can be seen that with respect to recognition tokens "back" and "in", a similar token 1220 is searched for and a peripheral token 1230 is further searched for as indicated with the reference numeral 1210 of FIG. 12.

For example, it can be seen that because the recognition tokens "back" and "in" are presented among the plurality of tokens, the similar token search module 322 may search for the similar token 1220 similar to the recognition tokens as described in FIG. 11, and the peripheral token search module 323 may search for tokens "kiss", "of", and "three" as indicated with the reference numeral 1230 as a peripheral token of the recognition token "bad" which is located just after the recognition token "back" and "in".

The peripheral token may be searched for under the specific conditions. For example, language models for the recognition tokens "back", "in", and "bad" may be considered. That is, in response to scores of the language models, which are in consideration of frequencies or probabilities that the tokens "back", "in", "bad", and the like are actually used, being low, a peripheral token may be searched for. In the exemplary embodiment, the score of the language model for "bad" is low, and thus a peripheral token which may appear in a periphery of "bad" may be searched for.

According to an exemplary embodiment, the peripheral token search module 323 may delete a peripheral token in which the degree of similarity to a corresponding recognition token is less than or equal to a predetermined value among the searched peripheral tokens.

For example, in the example of FIG. 5, the tokens "naeil" and "ui" having the low degree of similarity to the recognition token "jugeulrae" may be deleted from the searched peripheral token 513. Accordingly, reduction in the processing rate of the voice recognition apparatus 300 due to a lot of searching for the peripheral tokens may be alleviated by deleting the peripheral token having the low degree of similarity to the recognition token.

Figure 13:
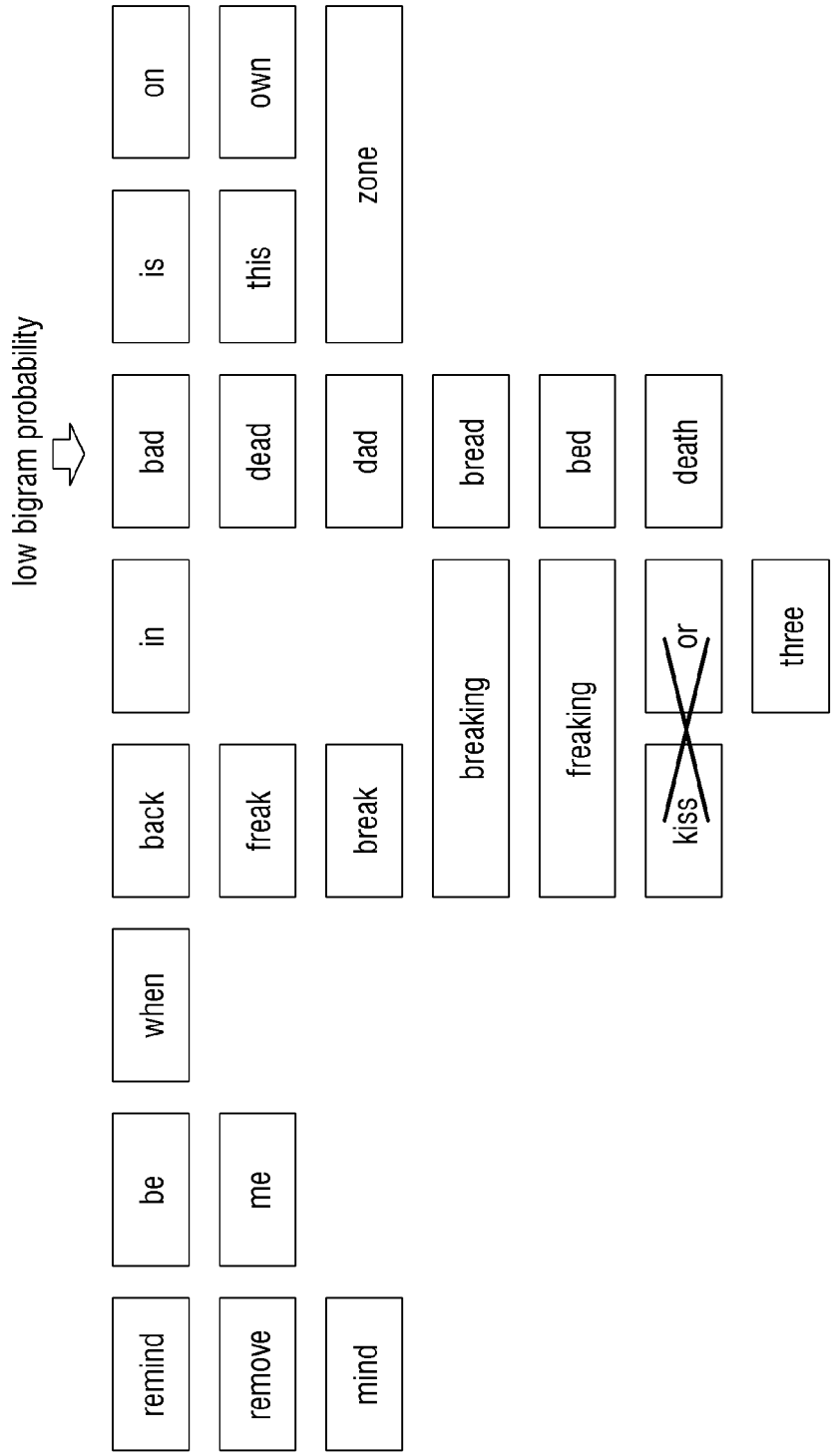
FIG. 13 is a diagram illustrating a token network according to an exemplary embodiment.

Similarly, in the exemplary embodiment of FIG. 13, the tokens "kiss" and "of" having the low degree of similarity to the recognition tokens "back" and "in" may be deleted from the searched peripheral tokens. Accordingly, reduction in the processing rate of the voice recognition apparatus 300 due to a lot of searching for the peripheral tokens may be alleviated by deleting the peripheral token having the low degree of similarity to the recognition token.

Like the example of the similar token search module 322, the peripheral token search module 323 may alleviate the reduction in the processing rate of the voice recognition apparatus 300 by restricting a search range and a maximum searching number.

The above-described exemplary embodiment has described the example that the similar token search module 322 and the peripheral token search module 323 may search for the similar token and the peripheral token in response to the recognition token not being present among the plurality of tokens 337. However, the disclosure is not limited thereto, and only any one of the similar token search module 322 and the similar token search module 323 may be operated.

The network generation module 324 may generate a token network using the plurality of recognition tokens generated in the token division module 321, the similar tokens searched for in the similar token search module 322, and the peripheral tokens searched for in the peripheral token search module 323.

For example, the network generation module 324 may generate a trellis type token network. Each node of the network may be each token. That is, in response to n recognition tokens being generated and the recognition tokens being t1, t2, . . . , and tn, a token network may be generated in such a manner that a similar token and a peripheral token corresponding to each recognition token may be arranged in a time line corresponding to the recognition token, and tokens arranged in the same time line may not be coupled to each other and may be coupled to all tokens of a time line adjacent to the time line.

That is, the token network may have a structure that a recognition token, a similar token, and a peripheral token arranged in an i-th time line may be coupled to a recognition token, a similar token, and a peripheral token arranged in an i+1-th time line. A similar token of the recognition token ti may be arranged in the same i-th time line as the recognition token ti, a peripheral token which appears in the left of the recognition token ti among peripheral tokens of the recognition token ti may be arranged in the same i−1-th time line as the recognition token ti−1, and a peripheral token which appears in the right of the recognition token ti may be arranged in the same i+1-th time line as the recognition token ti+1. FIG. 6 illustrates an example of a trellis type token network generated through the network generation module 324.

The transition probability calculation module 326 may calculate a transition probability between the tokens on the token network generated through the network generation module 324. The transition probability generation module 326 may calculate the transition probability between the tokens using language models 334, 335, and 336 corresponding to the content list 331, the corpus 332, and the utterance log 333 stored in the storage unit 330.

For example, in response to the token network being the trellis type token network exemplified in the description of the network generation module 324, the transition probability calculation module 326 may calculate the transition probability of from an i-th node to an i+1-th node as a weighted sum of a probability LM_content list in the content list language model, a probability LM_corpus in the corpus language model, a probability LM_utterance log in the utterance log language model, and degree Sim_ti+1 of similarity to an i+1-th recognition token. That is, in response to arbitrary one token in the i-th time line being "a" and arbitrary one token in the i+1-th time line being "b", a transition probability T(a,b) may be calculated below.

$$T(a,b)=\alpha*LM\_content\ list(a,b)+\beta*LM\_corpus(a,b)+\gamma*LM\_utterance\ log(a,b)+\delta*Sim(ti+1,b).$$

Here, α is a content list language model weight, β is a corpus language model weight, γ is an utterance log language model weight, and δ is a pronunciation similarity weight.

The optimum sentence generation module 327 may generate text data for the corrected user utterance by searching for an optimum path on the token network based on the transition probability between the tokens on the token network calculated through the transition probability calculation module 326. For example, the optimum sentence generation module 327 may search for the optimum path which causes the transition probability to have the largest value through a decoding method such as Viterbi searching or a-star searching based on the transition probability value between the tokens on the token network.

Figure 7:
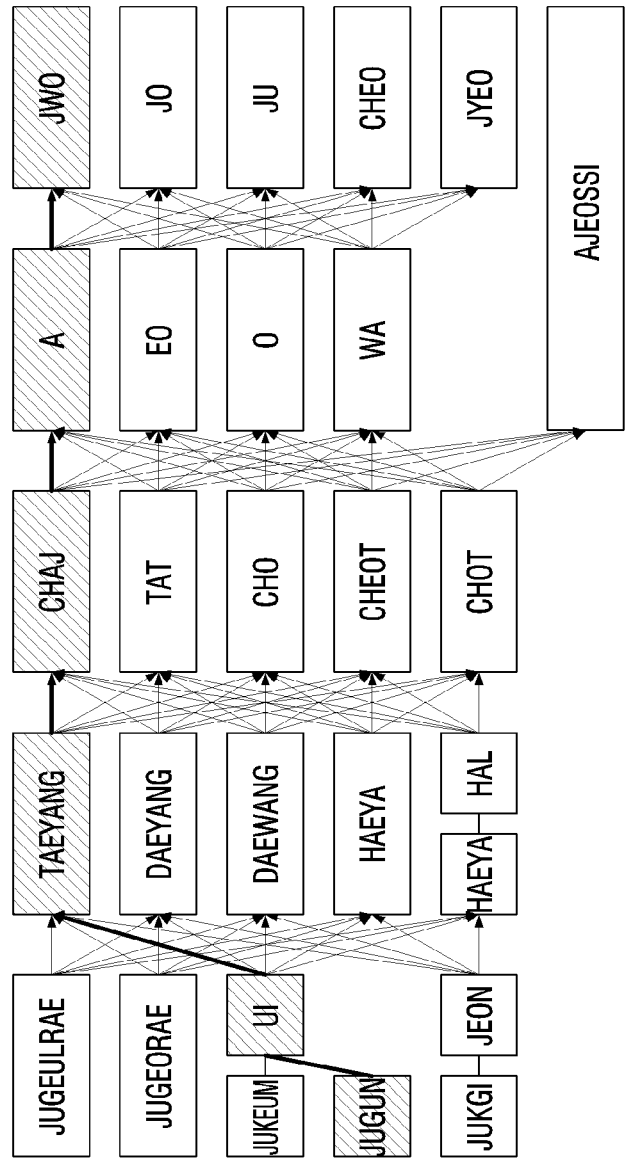
FIG. 7 is a diagram illustrating a searched result of an optimum on a token network according to an exemplary embodiment.

FIG. 7 illustrates a searching result for an optimum path on a token network in the optimum sentence generation module 327. That is, it can be seen that "jugun", "ui", "taeyang", "chaj", "a", and "jwo" are searched for as the optimum path. Accordingly, the optimum sentence generation module 327 may generate "Jugunui taeyang chajajwo" as the text data for the corrected user utterance.

That is, even in response to "Jugunui taeyang chajajwo" being uttered by the user and a recognition error being generated by recognizing the user utterance as "Jugeulrae taeyang chajajwo" through the voice recognizers 110 and 310, the voice recognition apparatuses 100 and 300 according to an exemplary embodiment may exactly correct the wrongly recognized user utterance as "Jugunui taeyang chajajwo".

Figure 14:
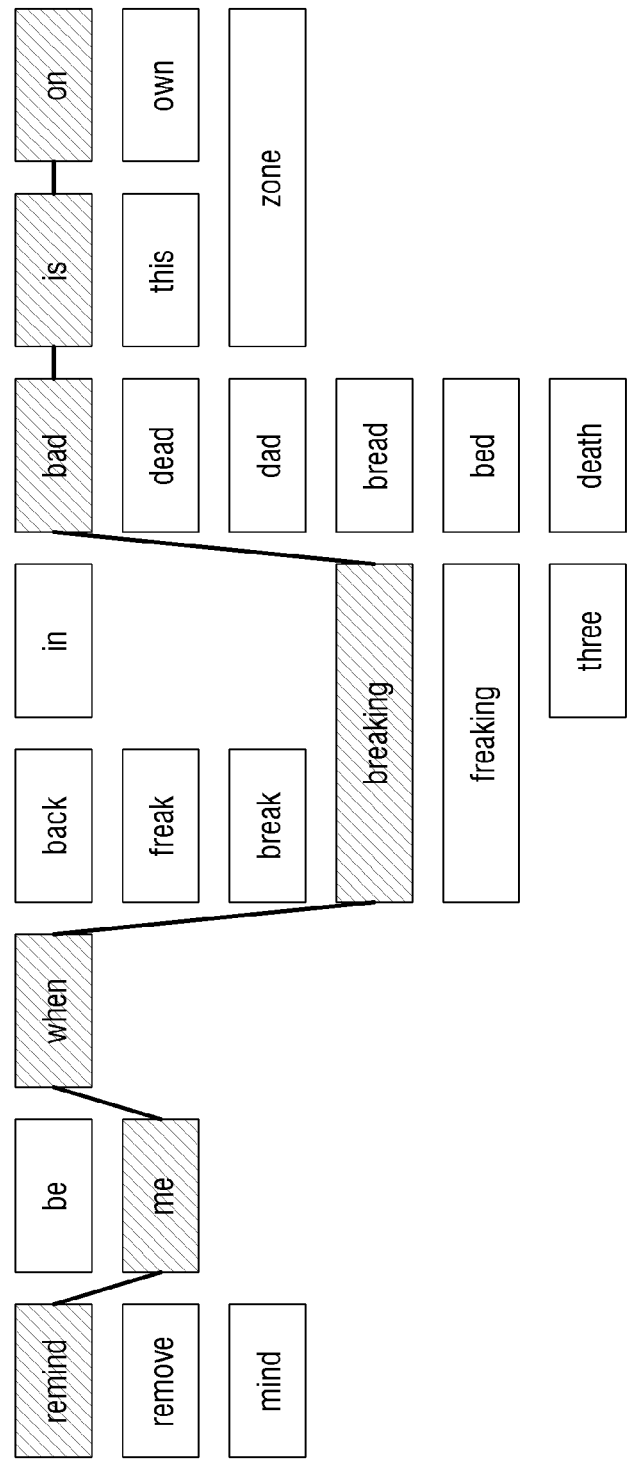
FIG. 14 is a diagram illustrating a searched result of an optimum on a token network according to an exemplary embodiment.

FIG. 14 illustrates a searching result for an optimum path on a token network in the optimum sentence generation module 327. That is, it can be seen that "remind", "me", "when", "breaking", "bad", "is", and "on" are searched for as the optimum path. Accordingly, the optimum sentence generation module 327 may generate "Remind me when breaking bad is on" as the text data for the corrected user utterance.

Similarly, even in response to "Remind me when breaking bad is on" being uttered by the user and an recognition error being generated by recognizing the user utterance as "Remind be when back in bad is on" through the voice recognizers 110 and 310, the voice recognition apparatuses 100 and 300 according to an exemplary embodiment may exactly correct the wrongly recognized user utterance as "Remind me when breaking bad is on".

Referring to the example of FIG. 3 and the description thereof, it can be seen that the token division module 321, the similar token search module 322, the peripheral token search module 323, and the network generation module 324 in the configuration of the processor 320 may be a configuration corresponding to the token network generator 130 of FIGS. 1 and 2.

The voice recognition apparatuses 100 and 300 described above may be applied to any electronic apparatus including various display apparatuses such as a television (TV), a portable phone, a personal computer (PC), or a laptop computer, home appliances such as a refrigerator or a washing machine, and the like which may be controlled through a user voice. The corrected user utterance generated through the voice recognition apparatuses 100 and 300 may be used to control various electronic apparatuses to which the voice recognition apparatuses 100 and 300 are applied through various methods such as content searching, information searching, and apparatus control.

Figure 8:
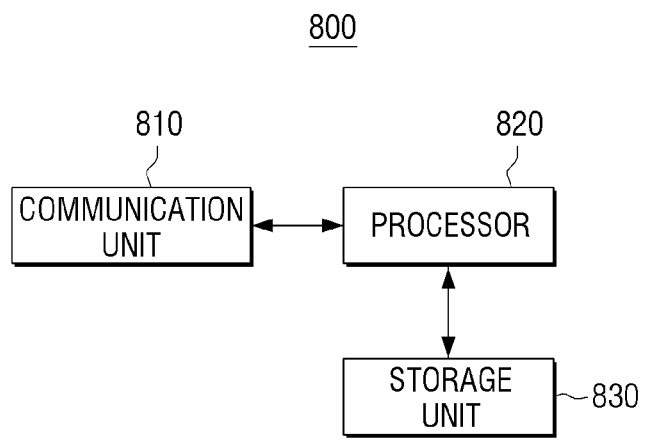
FIG. 8 is a block diagram illustrating a configuration of a voice recognition apparatus according to an exemplary embodiment.

FIG. 8 is a block diagram illustrating a configuration of a voice recognition apparatus according to an exemplary embodiment. Referring to FIG. 8, a voice recognition apparatus 800 may include a communication unit 810, a processor 820, and a storage unit 830.

The communication unit 810 may perform communication with an external apparatus (not shown). For example, the communication unit 810 may receive text data for user utterance from the external apparatus. In this example, in response to the user utterance being recognized in the external apparatus and text data for the recognized user utterance being generated and transmitted from the external apparatus, the communication unit 810 may receive the text data. In an example, the communication unit 810 may transmit text data for corrected user utterance generated in the processor 820 to the external apparatus.

In this example, the communication unit 810 may include various communication cards and modules such as a wired local area network (LAN) card, a wireless LAN card, a Bluetooth module, a near field communication (NFC) module, and a wireless communication module. The wireless communication module may refer to a module which performs communication according to a communication standard such as IEEE, Zigbee, 3rd generation (3G), 3rd generation partnership project (3GPP), or long term evolution (LTE).

The processor 820 may control the communication unit 810 to receive the next data for the user utterance recognized through the external apparatus, and transmit the text data for the corrected user utterance to the external apparatus. The storage unit 830 may be constructed with a separate database.

A configuration and operation of the processor 820 and the storage unit 830, which are not described above, are the same as those of the processor 320 and the storage unit 330 of FIG. 3, and thus a description thereof will be omitted.

In the exemplary embodiment of FIG. 8, the voice recognition apparatus 800 may be a server, and the external apparatus may be an arbitrary electronic apparatus including a voice recognizer. That is, the recognition of the user utterance may be performed through the external apparatus, and the recognition error correction for the recognized user utterance may be performed through the voice recognition apparatus 800.

For example, in response to the user utterance being recognized through the external apparatus and the recognized user utterance being transmitted to the server type voice recognition apparatus 800, the voice recognition apparatus 800 may receive the user utterance, correct the user utterance like the voice recognition apparatus of FIGS. 1 to 3, and transmit the text data corresponding to the corrected user utterance to the external apparatus.

In the voice recognition apparatus 800 of FIG. 8, an utterance log stored in the storage unit 830 may include an entire utterance log of all users of the external apparatus coupled thereto in addition to an individual utterance log of each user of the external apparatus. This is because in response to the voice recognition apparatus 800 being a server, a recognition result for the utterance of each electronic apparatus user may be acquired as an utterance log from a plurality of electronic apparatuses coupled to the server.

In this example, the storage unit 830 may further include an utterance log model of all the users in addition to an utterance log model of the individual external apparatus user, and the processor 830 may calculate the transition probability further using the entire utterance log module in calculating of the transition probability.

Figure 9:
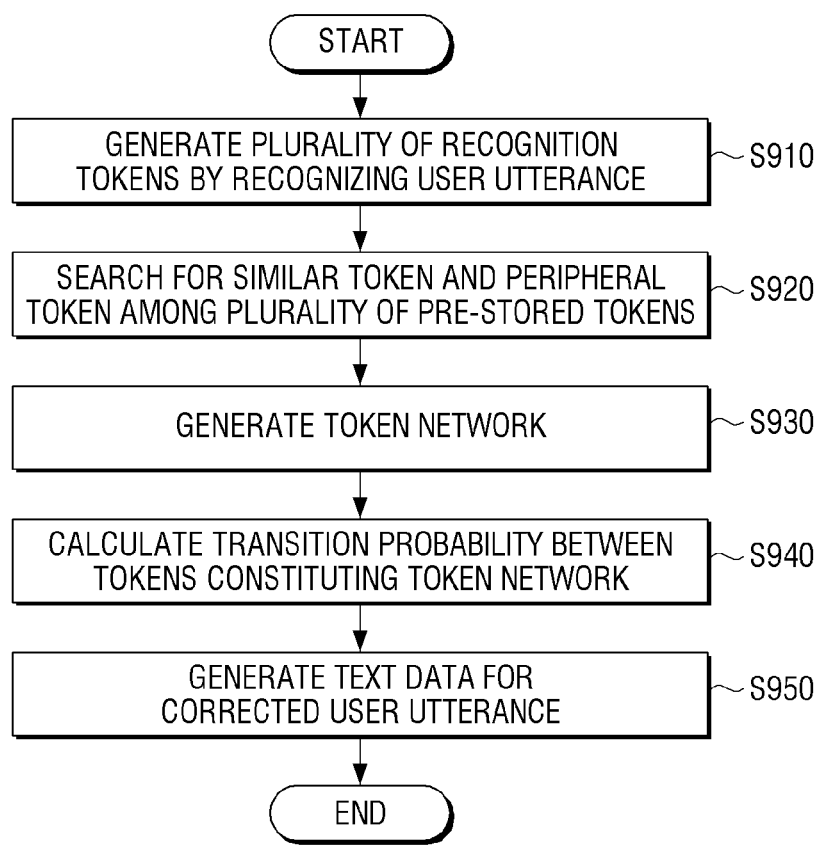
FIG. 9 is a flowchart illustrating a control method of a voice recognition apparatus according to an exemplary embodiment.

Hereinafter, control methods of the voice recognition apparatuses 100, 300, and 800 according to exemplary embodiments will be described with reference to FIGS. 9 and 10. Description for a portion overlapping the portion described in FIGS. 1 to 8 will be omitted FIG. 9 is a flowchart illustrating a control method of the voice recognition apparatuses 100 and 300 according to an exemplary embodiment. Referring to FIG. 9, the voice recognition apparatus 100 or 300 may generate a plurality of recognition tokens by recognizing user utterance (operation S910). For example, the voice recognition apparatus 100 or 300 may generate text data for the user utterance by recognizing the user utterance, and generate the plurality of recognition tokens by dividing the text data for the generated user utterance in predetermined units. The predetermined units may be syllable units, morpheme units, word units, and the like.

The voice recognition apparatus 100 or 300 may search for a similar token similar to each recognition token, and a peripheral token having a history used with the recognition token among a plurality of pre-stored tokens (operation S920). The plurality of pre-stored tokens may be generated by dividing a content list, a corpus, and an utterance log in predetermined units of tokens.

According to an exemplary embodiment, in response to a recognition token being presented among the plurality of pre-stored tokens, the voice recognition apparatus 100 or 300 may search for the similar token using pre-stored degree of similarity between the pre-stored tokens. In response to the recognition token not being presented among the plurality of pre-stored tokens, the voice recognition apparatus 100 or 300 may search for the similar token using a string searching algorithm. In response to the recognition token not being presented among the plurality of pre-stored tokens, the voice recognition apparatus 100 or 300 may search for a peripheral token.

In response to the plurality of recognition tokens being generated, and the similar tokens and the peripheral tokens for the recognition tokens being searched for, the voice recognition apparatus 100 or 300 may generate a token network using the recognition tokens, the similar tokens, and the peripheral tokens (operation S930). For example, the voice recognition apparatus 100 or 300 may generate the token network by arranging the similar tokens and the peripheral token to correspond to the plurality of recognition tokens. The token network may be a trellis.

In response to the token network being generated, the voice recognition apparatus 100 or 300 may calculate a transition probability between the tokens constituting the token network (operation S940). For example, the voice recognition apparatus 100 or 300 may calculate the transition probability between the tokens using language modes for the pre-stored content list, corpus, and utterance log. In an example, the voice recognition apparatus 100 or 300 may calculate the transition probability between the tokens on the token network by assigning predetermined weights to the language models. The predetermined weights may be experimentally determined by a manufacturer.

The voice recognition apparatus 100 or 300 may generate text data for corrected user utterance using the calculated transition probability (operation S950). For example, the voice recognition apparatus 100 or 300 may generate the text data for the corrected user utterance by searching for an optimum path on the token network based on the calculated transition probability between the tokens. The optimum path may be searched for using at least one algorithm of Viterbi or a-star.

In response to the text data for the corrected user utterance being generated, the voice recognition apparatus 100 or 300 may calculate a probability that the corrected user utterance actually occurs. In response to the probability that the corrected user utterance actually occurs being less than or equal to a predetermined value, the voice recognition apparatus 100 or 300 may output a re-utterance request message.

Figure 10:
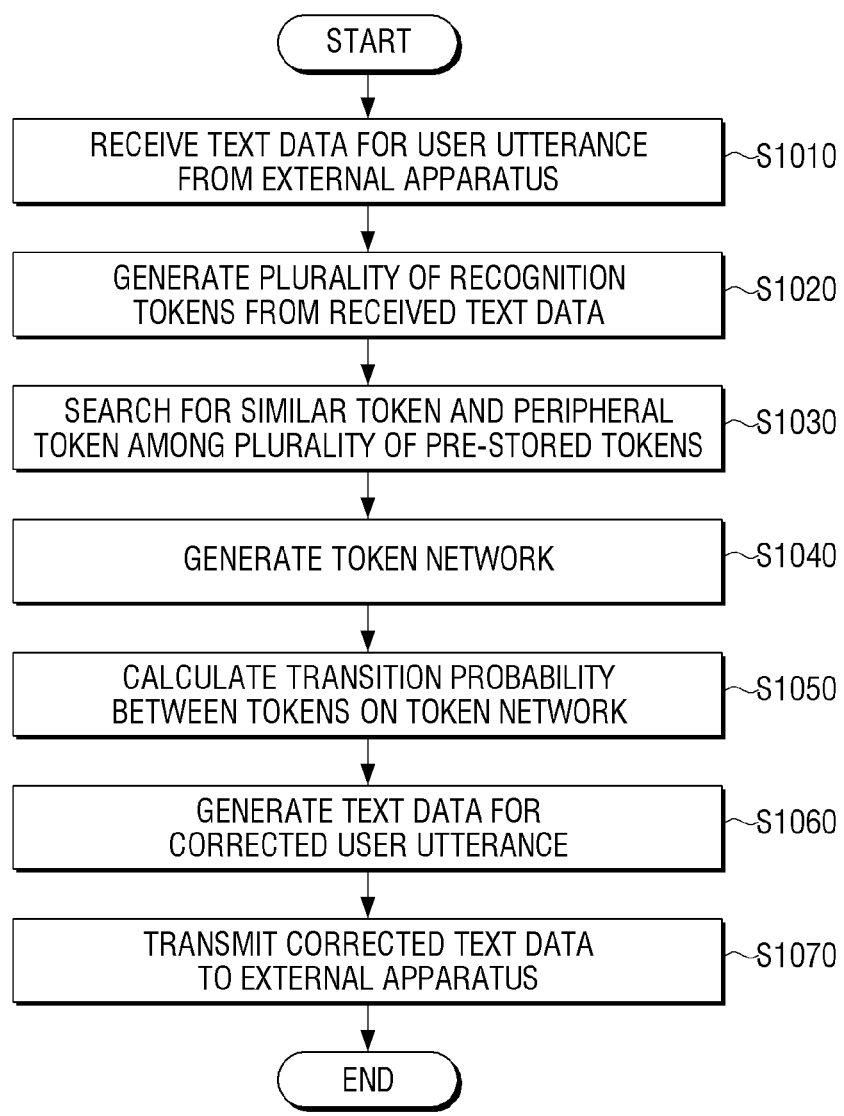
FIG. 10 is a flowchart illustrating a control method of a voice recognition apparatus according to an exemplary embodiment.

FIG. 10 is a flowchart illustrating a control method of the voice recognition apparatus 800 according to an exemplary embodiment. Referring to FIG. 10, in response to text data for user utterance being received from an external apparatus (not shown) (operation S1010), the voice recognition apparatus 800 may generate a plurality of recognition tokens from the received text data (operation S1020). The voice recognition apparatus 800 may search for a similar token and a peripheral token for each of the recognition tokens among a plurality of pre-stored tokens (operation S1030), and generate a token network using the recognition tokens, the similar tokens, and the peripheral tokens (operation S1040). The voice recognition apparatus 800 may calculate a transition probability between tokens on the generated token network (operation S1050), and calculate text data for corrected user utterance using the calculated transition capability (operation S1060). Accordingly, the voice recognition apparatus 800 may transmit the corrected text data to the external apparatus (operation S1070).

Operations S1030 to S1060 in FIG. 10 are the same as operations S920 to S950 in FIG. 9, and thus a detailed description thereof are omitted.

According to various exemplary embodiments, all kinds of utterance recognition errors which may occur in response to user utterance being recognized in a voice recognition apparatus may be exactly and efficiently corrected.

The operations of the token network generator and the processor in the voice recognition apparatus and the control methods of the voice recognition apparatus according to various exemplary embodiments may be implemented in a program code, and may be provided in a form stored in a non-transitory readable medium. The voice recognition apparatus mounted with the non-transitory readable medium may execute the control methods of the voice recognition apparatus according to the various exemplary embodiments by executing the program code.

For example, a program code for executing a control method of a voice recognition apparatus including generating a plurality of recognition tokens by recognizing user utterance, searching for a similar token similar to each of the recognition tokens and a peripheral token having a history used with the recognition token among a plurality of pre-stored tokens, generating a token network using the recognition token, the similar token, and the peripheral token, and calculating a transition probability between the tokens constituting the token network and generating text data for corrected user utterance using the calculated transition probability may be stored in the non-transitory computer-readable medium and provided.

The non-transitory computer-recordable medium is not a medium configured to temporarily store data such as a register, a cache, or a memory, but an apparatus-readable medium configured to permanently or semi-permanently store data. For example, the programs may be stored in the non-transitory apparatus-readable medium such as a compact disc (CD), a digital versatile disc (DVD), a hard disc, a Blu-ray disc, a universal serial bus (USB), a memory card, or a read only memory (ROM) and provided.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A method of controlling a voice recognition apparatus, the method comprising:
    generating a plurality of recognition tokens based on a voice signal received by the voice recognition apparatus;
    searching for a similar token and a peripheral token for each of the recognition tokens, from among a plurality of pre-stored tokens, the similar token being a pre-stored token having a high degree of similarity with the recognition token and the peripheral token being a pre-stored token previously used with the recognition token;
    generating a token network using the recognition tokens, the similar tokens, and the peripheral tokens;
    calculating a transition probability between the tokens constituting the token network; and
    generating text data for the received voice signal using the calculated transition probability,
    wherein, in response to a first recognition token not being present among the plurality of pre-stored tokens, the searching includes searching for the peripheral token corresponding to a second recognition token located just after the first recognition token.

2. The method as claimed in claim 1, wherein the plurality of pre-stored tokens are generated by dividing at least one of a content list, a corpus, and an utterance log by predetermined units of tokens.

3. The method as claimed in claim 1, wherein the searching includes searching for the similar token using a string searching algorithm in response to the recognition token not being presented among the plurality of pre-stored tokens.

4. The method as claimed in claim 1, which the generating of the plurality of recognition tokens includes:
    generating intermediate text data for the received voice signal by recognizing the received voice signal; and
    generating the plurality of recognition tokens by dividing the generated intermediate text data for the received voice signal in predetermined units,
    wherein the generating of the token network includes arranging the similar tokens and the peripheral tokens to correspond to the plurality of recognition tokens.

5. The method as claimed in claim 1, further comprising:
    calculating a probability in which the text data occurs; and
    outputting a request message to repeat the voice signal in response to the probability in which the text data occurs being less than or equal to a predetermined value.

6. The method as claimed in claim 2, wherein the generating of the text data for the received voice signal includes:
    calculating the transition probability between the tokens by assigning predetermined weights to language models; and
    searching for an optimum path on the token network based on the calculated transition probability between the tokens.

7. The method as claimed in claim 6, wherein the searching for the optimum path includes using at least one of a Viterbi algorithm and an a-star algorithm.

8. A voice recognition apparatus comprising:
    a voice recognizer configured to receive a voice signal;
    a storage unit configured to store a plurality of tokens;
    a token network generator configured to generate a plurality of recognition tokens based on the received voice signal, to search for a similar token and a peripheral token for each of the recognition tokens, from among the plurality of pre-stored tokens, the similar token being a pre-stored token having a high degree of similarity with the recognition token and the peripheral token being a pre-stored token previously used with the recognition token, and to generate a token network using the recognition tokens, the similar tokens, and the peripheral tokens; and
    a processor configured to control the token network generator to generate the token network in response to the voice signal being received by the voice recognizer, to calculate a transition probability between the tokens constituting the token network, and to generate text data for the received voice signal using the calculated transition probability, wherein, in response to a first recognition token not being present among the plurality of pre-stored tokens, the token network generator searches for the peripheral token corresponding to a second recognition token located just after the first recognition.

9. The voice recognition apparatus as claimed in claim 8, wherein the storage unit stores the plurality of tokens, generated by dividing at least one of a content list, a corpus, and an utterance log by predetermined units of tokens, and a degree of similarity between the tokens, and the token network generator searches for the similar tokens using the degree of similarity between the tokens in response to the recognition token being presented among the plurality of stored tokens.

10. The voice recognition apparatus as claimed in claim 8, wherein the token network generator searches for the similar tokens using a string searching algorithm in response to the recognition token not being presented among the plurality of stored tokens.

11. The voice recognition apparatus as claimed in claim 8, wherein the processor generates intermediate text data for the received voice signal in response to the voice signal being received by the voice recognizer, and the token network generator generates the plurality of recognition tokens by dividing the generated intermediate text data for the received voice signal in predetermined units, and generates the token network by arranging the similar tokens and the peripheral tokens to correspond to the plurality of recognition tokens.

12. The voice recognition apparatus as claimed in claim 11, wherein the processor calculates the transition probability between the tokens by assigning predetermined weights to language models, and generates the text data for the received voice signal by searching for an optimum path on the token network based on the calculated transition probability between the tokens.

13. The voice recognition apparatus as claimed in claim 12, wherein the processor searches for the optimum path using at least one of a Viterbi algorithm and an a-star algorithm.

14. The voice recognition apparatus as claimed in claim 8, further comprising at least one of a display configured to display an image and an audio output unit configured to output sound, wherein the processor calculates a probability in which the text data occurs, and controls the at least one of the display and the audio output unit to output a request message to repeat the voice signal in response to the probability in which the text data occurs being less than or equal to a predetermined value.

15. A non-transitory computer-readable medium including a program code configured to execute the method of claim 1.

16. A method of voice recognition, comprising:

generating, using a processor, words of text based on a voice signal received by a voice recognition apparatus, as an initial recognition;

adding the words of the initial recognition to a word network;

for each word of the initial recognition, adding a similar-sounding word to the word network, and selectively adding a peripheral word previously used in conjunction with the word of the initial recognition to the word network if the peripheral word exists;

calculating a transition probability between each word in the to the word network; and generating a final recognition of the received voice signal using the calculated transition probability.

\* \* \* \* \*